(12) United States Patent
Pedemonte

(10) Patent No.: US 8,033,274 B2
(45) Date of Patent: Oct. 11, 2011

(54) SPEAR GUN WITH AN ADJUSTABLE GRIP

(75) Inventor: Stefano Pedemonte, Genoa (IT)

(73) Assignee: Cressi-Sub S.p.A., Genoa (IT)

( * ) Notice: Subject to any disclaimer, the term of this patent is extended or adjusted under 35 U.S.C. 154(b) by 328 days.

(21) Appl. No.: 11/825,419

(22) Filed: Jul. 5, 2007

(65) Prior Publication Data

US 2008/0017181 A1    Jan. 24, 2008

(30) Foreign Application Priority Data

Jul. 5, 2006 (IT) .............................. FI20060042 U

(51) Int. Cl.
*F41B 7/04* (2006.01)
(52) U.S. Cl. ........................................ 124/20.3; 124/88
(58) Field of Classification Search ....... 43/6; 124/20.3, 124/25, 88
See application file for complete search history.

(56) References Cited

U.S. PATENT DOCUMENTS

| 4,966,124 | A | * | 10/1990 | Burling | 124/23.1 |
| 5,081,979 | A | * | 1/1992 | Burling | 124/23.1 |
| 5,469,834 | A | * | 11/1995 | Higgins et al. | 124/88 |
| 5,842,460 | A | * | 12/1998 | Barber | 124/88 |
| 5,853,001 | A | * | 12/1998 | Vyprachticky | 124/88 |

FOREIGN PATENT DOCUMENTS

IT    BO2005A000656    7/2009

\* cited by examiner

*Primary Examiner* — John Ricci
(74) *Attorney, Agent, or Firm* — Pollack, P.C.

(57) ABSTRACT

A spear gun for scuba diving that comprises a frame with a body that is generally elongated along a longitudinal axis of the gun, and a grip at one end of and extending from the elongated body. The grip includes a stationary part attached to, and integrally with, the body and a movable part adjustably mounted to the stationary part. A device is also provided for securing or locking the movable part to the stationary part when a desired grip configuration has been achieved.

4 Claims, 2 Drawing Sheets

SPEAR GUN WITH AN ADJUSTABLE GRIP

FIELD OF THE INVENTION

The present invention relates generally to aquatic activities and, more particularly, to weapons for use in scuba diving and the like.

BACKGROUND OF THE INVENTION

Conventional spear guns, such as those utilized in scuba diving, typically comprise a frame having a grip with an elongated body extending therefrom, and a spear slidingly engaged on and with the body. Upon loading the gun, elastic cables under tensile stress store potential energy for exerting a propulsion force on the spear. By pulling a trigger situated immediately in front of the grip, the spear is then released and launched toward the intended prey.

To optimize spear gun performance, it is considered important that the gun be held steadily and safely by only one hand of the scuba diver during use. In this regard, it has been found particularly important not only that the grip be sized and shaped suitably for grasping by the user, but also that it be readily adaptable to conform to the user's hand. A further consideration is that the scuba diver is likely to be wearing gloves of substantial thickness.

Spear guns for scuba divers typically have a stationary grip mounted at one end, the grip being sized based on an average of a wide range of hand measurements in order to accommodate a large number of users. Other spear guns are provided with a replaceable grip so that each user can have the gun fit with a grip that best suits their particular needs. Alternatively, the gun may be sold with several interchangeable grips for use in different operating conditions, e.g., with or without gloves. While useful, such an arrangement often results in greater structural complexity and cost. It also requires that merchants stock all of the various grip sizes, making the product onerous to sell and less desirable for merchants to offer as part of their product line to consumers.

OBJECTS AND SUMMARY OF THE INVENTION

Accordingly, it is an object of the present invention to provide a spear gun for scuba divers with a grip that may be readily adjusted according to a user's needs.

Another object of the present invention is to provide spear gun for scuba divers which mounts a grip that is adjustable in a particularly straightforward manner, both structurally and functionally.

According to one aspect of the present invention, a spear gun for scuba divers is provided, the gun comprising a grip having at least two parts, one part being secured to the frame of the gun and the other being movably mounted to the part of the gun that is secured to the frame. A connector between the secured part and movable part permits adjustment of the respective parts relative to one another.

In accordance with another aspect of the present invention, there is provided a spear gun comprising a frame with a body that is generally elongated along a longitudinal axis of the gun and a grip at one end of and extending from the elongated body. The grip includes a stationary part attached to and integrally with the elongated body and a movable part adjustably mounted to the stationary part. The grip also has a device for locking the movable part relative to the stationary part when a desired configuration of the grip has been achieved, the locking device being operative in a direction perpendicular to a common plane of the stationary and movable parts. The stationary part has a central rib along a side facing in a direction opposite to that in which the elongated body extends, the movable part having a substantially U-shaped cross-section for engagement with the rib.

According to a further embodiment, a spear gun is provided which comprises a frame with a body that is generally elongated along a longitudinal axis of the gun and a grip at one end of and extending from the elongated body. The grip includes a stationary part attached to and integrally with the elongated body and a movable part adjustably mounted on the stationary part. Also provided is a device for locking the movable part relative to the stationary part when a desired configuration of the grip has been achieved. The stationary part has a central rib along a side facing in a direction opposite to that in which the elongated body extends, the movable part having a substantially U-shaped cross-section for engagement with the rib.

BRIEF DESCRIPTION OF THE DRAWINGS

A specific, illustrative adjustable grip for a spear gun, according to the present invention, is described below with reference to the accompanying drawings, in which.

The same numerals are used throughout the drawing figures to designate similar elements. Still other objects and advantages of the present invention will become apparent from the following description of the preferred embodiments.

DETAILED DESCRIPTION OF THE PREFERRED EMBODIMENTS

Figure 1:
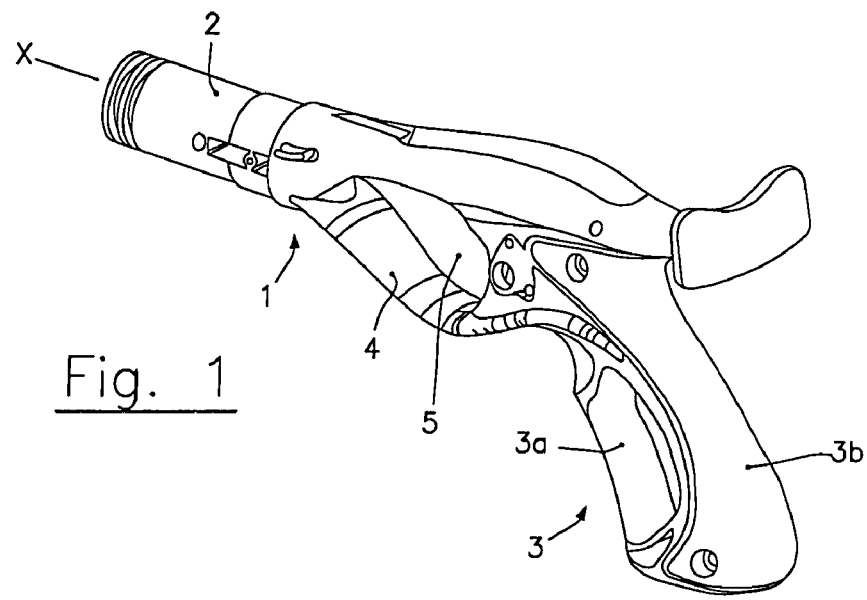
FIG. 1 is a perspective view of a spear gun frame mounting a grip, according to one aspect of the present invention.
Figure 2:
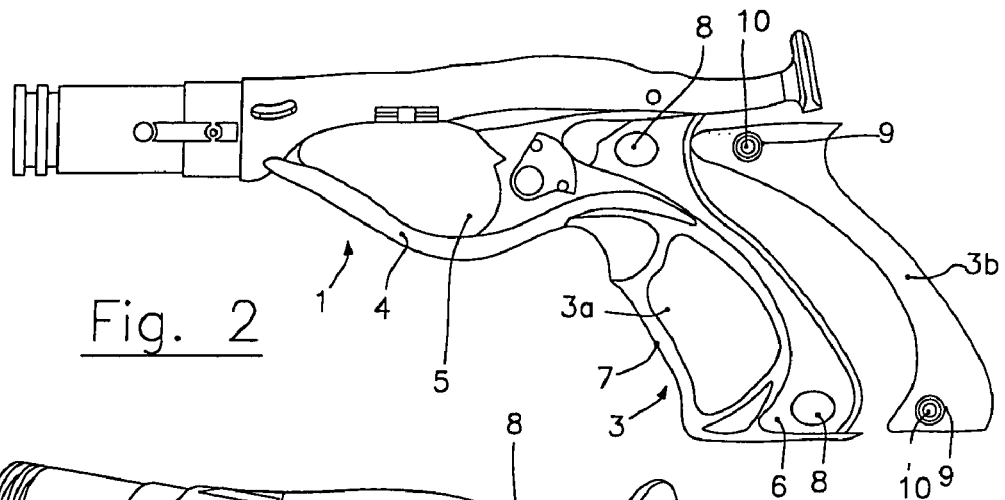
FIG. 2 is a side view of the frame illustrated in FIG. 1 showing two parts of the grip, according to the present invention.
Figure 3:
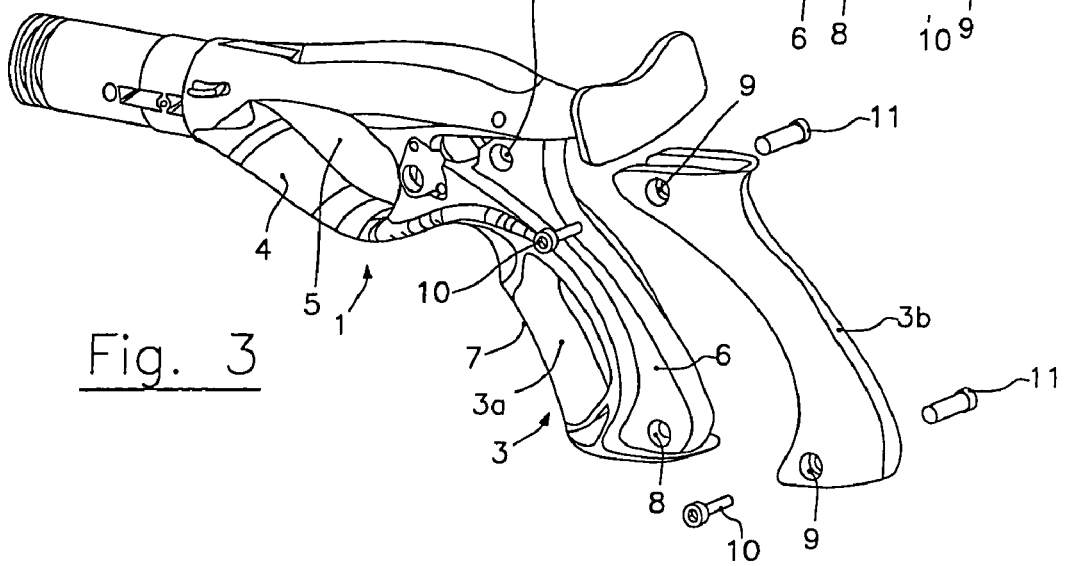
FIG. 3 is an exploded view of a grip portion of the frame as shown in FIG. 1.

Referring now to the drawings and, more particularly, to FIGS. 1-6, there is shown generally a specific, illustrative spear gun for scuba diving, according to various aspects of the present invention. In one embodiment, illustrated in FIG. 1, the gun includes a frame 1 with an elongated body 2 extending substantially along a longitudinal axis X of the gun, the body being selectively configured so as to engage a stem for supporting and guiding a spear (not shown). The body preferably terminates at a closed trigger guard 4 which extends along the body to form a space 5 for a trigger (not shown).

Grip 3 preferably comprises a stationary part 3a attached integrally to, and extending from, elongated body 2, and a movable part 3b joined to a rear portion of the stationary part. More specifically, the stationary part comprises a front portion 7, shaped anatomically for ease in grasping by the user's fingers, and has a central rib 6 extending over its entire length on the opposite side thereof. Movable part 3b desirably has an outer profile shaped suitably such that the user may comfortably rest the palm of his/her hand thereon, and has a substantially U-shaped cross-section, best seen in FIG. 3, suitable for engagement with central rib 6.

Longitudinal through slots 8, e.g., elliptical in shape, are desirably provided at each end respectively of the central rib, as illustrated in FIGS. 1-6. Two corresponding through holes 9, in turn, are provided in the movable part such that, when central rib 6 is engaged with movable part 3b, holes 9 are in alignment with slots 8. A pair of bolts 10 and nuts 11 engage holes 9 through the slots and, thereby, secure movable part 3b to stationary part 3a.

Loosening one or both of bolts 10 enables displacement of the movable part relative to the stationary part so as to adjust the movable part's position, as needed. The one or both bolts 10 are then tightened again to lock the movable part in a desired position. Shown in FIGS. 4-6 are three different positions in which movable part 3b can be placed relative to stationary part 3a.

Figure 4:
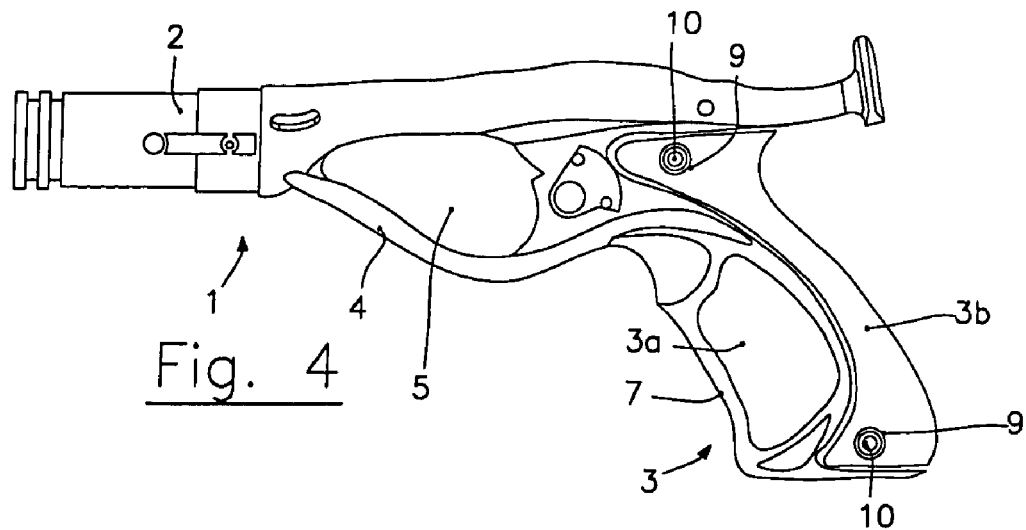
FIG. 4 shows a first adjustment mode for positioning a movable part of the grip relative to a stationary part of the grip shown in FIG. 1.
Figure 5:
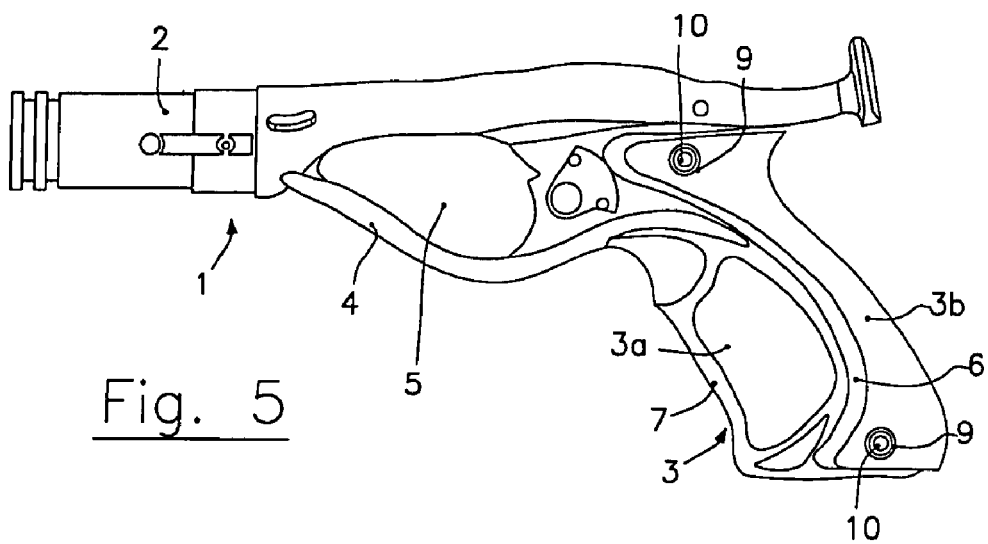
FIG. 5 shows a second adjustment mode for the movable part relative to the stationary part of the grip illustrated in FIG. 4.

Illustrated in FIG. 4 is a first arrangement in which movable part 3b preferably abuts, it its entirety, rib 6 of stationary part 3a, thus achieving a configuration corresponding to the narrowest grip achievable. FIG. 5, on the other hand, shows a second configuration, this one having the widest grip achievable, when the movable part only partially engages rib 6 of the stationary part. In the two configurations illustrated in FIGS. 4 and 5, variation in width of the grip is obtained by displacing movable part 3b toward and away from, but always parallel to stationary part 3a. A third and differentiated variation in grip width can also be accomplished by rotating the movable part about one or the other of bolts 10. For example, by rotating movable part 3b about the bolt nearest the longitudinal axis of the gun, as shown in FIG. 6, the width of the grip is reduced progressively beginning at its free end, where the width is at a maximum.

Figure 6:
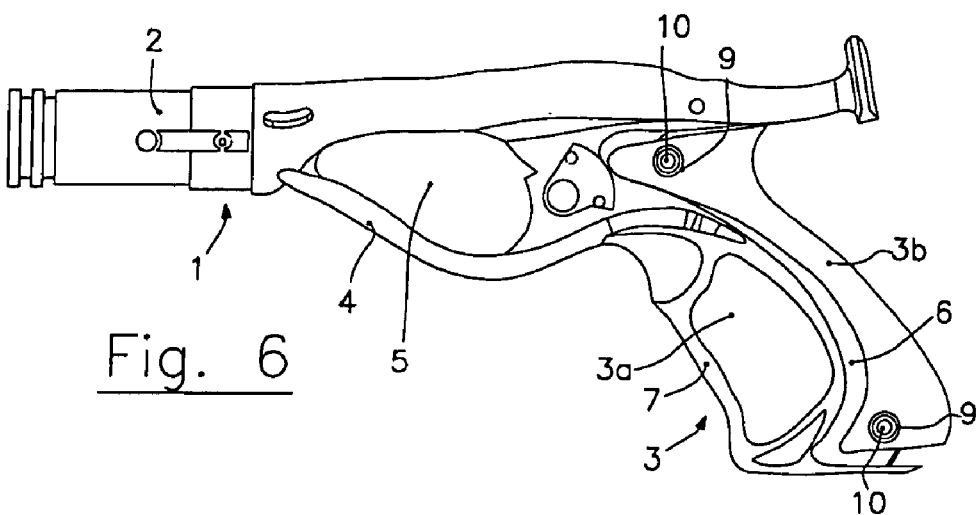
FIG. 6 shows a third mode for adjustment of the movable part in relation to the stationary part of the grip set forth in FIG. 4.

Although not shown in detail, it will be apparent to those skilled in the art that an opposite situation to the one shown in FIG. 6 can be obtained by rotating movable part 3b about bolt 10 situated in the vicinity of the free end of grip 3, thereby a widening the grip in the vicinity of its base, while maintaining a minimum width in proximity its free end. As those skilled in the art will also appreciate, other grip configurations may be achieved by combining rotation and lateral displacement of the movable part in a variety of ways.

Notably, rotation of the movable part relative to the stationary part is facilitated by "slack" existing between the two parts, and particularly by the fact that the movable part is slightly shorter than central rib 6 on the stationary part with which the movable part engages.

The thickness of the stationary part 3a and of movable part 3b in line with their adjoining edges is selected preferably to ensure a smooth and substantially continuous surface on the grip.

Various modifications and alterations to the present invention may be appreciated based on a review of this disclosure. These changes and additions are intended to be within the scope and spirit of the invention as defined by the following claims.

What is claimed is:

1. A spear gun comprising a frame with a body that is generally elongated along a longitudinal axis of the gun and a grip at one end of and extending from the elongated body, wherein the grip includes a stationary part attached to and integrally with the elongated body and a movable part adjustably mounted to the stationary part, with a device for locking the movable part relative to the stationary part when a desired configuration of the grip has been achieved, the locking device being operative in a direction perpendicular to a common plane of the stationary and movable parts, wherein the stationary part has a central rib along a side facing in a direction opposite to that in which the elongated body extends, the movable part having a substantially U-shaped cross-section for engagement with the rib.

2. A spear gun comprising a frame with a body that is generally elongated along a longitudinal axis of the gun and a grip at one end of and extending from the elongated body, wherein the grip includes a stationary part attached to and integrally with the elongated body and a movable part adjustably mounted on the stationary part, with a device for locking the movable part relative to the stationary part when a desired configuration of the grip has been achieved, wherein the stationary part has a central rib along a side facing in a direction opposite to that in which the elongated body extends, the movable part having a substantially U-shaped cross-section for engagement with the rib.

3. The spear gun set forth in claim 2, wherein longitudinal slots are formed in the rib with corresponding through holes on the movable part suitable for engaging bolts for locking the movable part on the stationary part.

4. The spear gun set forth in claim 3, wherein the movable part is displaceable generally equidistant from the stationary part or angularly displaceable about either of the locking bolts, a degree of slack being provided between the stationary part and the movable part in a selected direction along the length of the grip.

* * * * *